United States Patent Office 3,560,526
Patented Feb. 2, 1971

3,560,526
SUBSTITUTED TRIOXANES
Max M. Boudakian, Hamden, and Milton Lapkin, Woodbridge, Conn., assignors to Olin Mathieson Chemical Corporation
No Drawing. Filed Aug. 2, 1968, Ser. No. 749,617
Int. Cl. C07d 19/00
U.S. Cl. 260—340.7         6 Claims

ABSTRACT OF THE DISCLOSURE

Substituted trioxanes having the formula

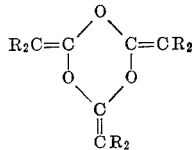

wherein R is hydrogen, halogen, cyano, alkyl or aryl are prepared by dehydrohalogenation of selected α-haloaldehydes. These substituted trioxanes are useful as end-capping reagents for polyacetal resins and as acetylating agents for alcohols, amines, acids, etc.; they are also valuable sources of monomeric ketenes.

---

This invention relates to a series of substituted trioxanes and to a process therefor. More particularly, this invention relates to substituted trioxanes containing selected exomethylene groups and having the formula

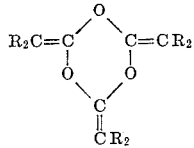

wherein R is an independently selected hydrogen, halogen, cyano, alkyl or aryl. Compounds having the Formula I can be also be designated as ketene trimers or trimeric cyclic ketene acetals.

Dimers and tetramers of ketene have been previously prepared and reported in the literature. For example, E. C. Horning, ed., Organic Synthesis, Coll. Vol. III, 1955, J. Wiley, N.Y., p. 508, reports the conversion of ketene to a dimer, while a ketene tetramer having the empirical formula $(C_2H_2O)_4$ is disclosed by H. Staudinger, Helv. Chim. Acta. 8, 329 (1925).

However, previous attempts to prepare trimers of ketene as typified by Formula I have been unsuccessful. Thus, for example, G. F. Pregaglia et al. in Makromol. Chem. 67, 10 (1963) disclose that the trimeric cyclic ketene acetal (i.e., compound I wherein R is methyl) was not observed in the cationic polymerization of dimethylketene in hydrocarbon solvents.

Now it has been found in accordance with the process of this invention that substituted trioxanes having the Formula I can be readily provided by dehydrohalogenation of the corresponding α-haloaldehyde trimer. The compounds of this invention are characterized by the presence of three reactive double bonds at the ring carbon atoms, rendering them useful in numerous applications.

More in detail, the process of this invention comprises reacting an α-haloaldehyde trimer with a basic compound to provide the substituted trioxanes I in accordance with the following general equation wherein X is halogen and R is as previously described.

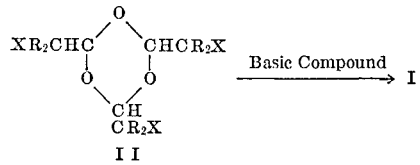

The α-haloaldehyde trimers II can be readily prepared by reaction of an appropriate haloaldehyde with sulfuric acid, e.g., as described by K. Natterer in Monatsh. Chem. 3, 442 (1882) wherein monochloroacetaldehyde half hydrate is reacted with sulfuric acid to provide chloroacetaldehyde trimer.

Suitable α-haloaldehyde trimers that can be employed in the process of this invention include those compounds II wherein R is hydrogen, halogen, i.e., fluorine, chlorine, bromine or iodine, cyano, alkyl having 1–20 carbon atoms or aryl having 6–10 ring carbon atoms and X is fluorine, chlorine, bromine or iodine. Illustrative α-haloaldehyde trimers include the trimers of chloroacetaldehyde, fluoroacetaldehyde, bromoacetaldehyde, iodoacetaldehyde, chloral, monochlorodifluoroacetaldehyde, dichloromonofluoroacetaldehyde, α,α,β-trichlorobutyraldehyde, α-chlorobutyraldehyde, α-bromobutyraldehyde, α-chlorocaprylaldehyde, α-chlorophenylacetaldehyde and α-chloro-α,α-dicyanoacetaldehyde.

While any of the aforementioned α-haloaldehyde trimers can be employed in the process of this invention, preferred embodiments utilize those trimers having the Formula II wherein R is hydrogen or lower alkyl, i.e., alkyl having 1–4 carbon atoms.

Any basic compound capable of dehydrohalogenating the α-haloaldehyde trimers II can be employed in the process of this invention. Suitable basic compounds include the alkali metal hydroxides such as sodium hydroxide, potassium hydroxide, cesium hydroxide and rubidium hydroxide; ammonium hydroxide; tertiary amines such as triethylamine, 2,6-lutidine, collidine, etc.; alkali and alkaline earth carbonates and oxides such as sodium carbonate, potassium carbonate, calcium carbonate, sodium oxide, calcium oxide; alkali metal alkoxides of branched alcohols, e.g. potassium tert-butoxide, sodium alcoholate of 2,6-dimethyl-4-heptanol or 2,6,8-trimethyl-4-nonanol, etc.; and other systems such as alkali or alkaline earth salts of carboxylic acids (e.g., sodium or calcium acetate) or phenols (e.g., lithium phenoxide).

Generally between about 2 and about 10 moles of basic compound are employed per mole of haloaldehyde trimer II; however preferred process embodiments employ between about 3 and about 6 moles of basic compound per mole of trimer.

Oxygen scavengers can also be employed in the preparation of the substituted trioxanes I; these materials inhibit polymerization of any polymerizable olefins present in the reaction mixture. Suitable oxygen scavengers include phenolic compounds such as hydroquinone, 2,6-di-tert-butyl-p-cresol, 2,2′-methylenebis(4-methyl-6-tert-butylphenol), etc.; primary polyamines, e.g., p,p′-diaminodiphenylmethane; bisdiarylamines, e.g., N,N′-diphenyl-p-phenylenediamine; etc.

A temperature between about 125 and about 250° C. is generally employed in the preparation of the substituted trioxanes I. However, while the reaction proceeds readily over the aforementioned range, temperatures between 150 and 225° C. are preferably employed. Pressure equipment may also be utilized and the reaction can be carried out between about 1 mm. and about 5 atm. of pressure; pressures between 0.5 and 1.5 atm. are preferably employed.

While the reaction proceeds readily in the absence of solvents, high boiling diluents such as alcohols and glycols can be suitably employed. Illustrative diluents are 2,3-dimethyl-3-pentanol, 3-methyl-3-pentanol, 2,3,3-trimethyl-3-pentanol, 2,3,4,4-tetramethyl-3-pentanol, 2,3-dimethyl-3-hexanol, tert-butyl alcohol, 3-heptanol, 2,5-dimethyl-4-heptanol, 2-methyl-7-ethyl-4-undecanol, 2-ethyl-4-isopropyl-7-methyl-2,7-octanediol, 2 - methyl - 6 - isopropyl-2,6-heptanediol and 2,18-diisopropyl-2,18-nonadecanediol.

The preparation of substituted trioxanes I in accordance with the process of this invention is particularly surprising and unexpetced since no ring scission occurs as would be expected from the work of prior investigators. For example, T. Iwata et al. in Makromol. Chem. 77, 229 (1964) report the preparation of monochloroacetaldehyde by the pyrolysis of the cyclic trimer.

The substituted trioxanes I of this invention have a variety of useful applications. For example, they are valuable end-capping reagents for polyacetal resins, conferring stability on the resins by the addition of ester groups at the end of the polyacetal chain.

The substituted trioxanes I are also valuable as sources of monomeric ketenes, which they form by pyrolysis. This application minimizes the storage and transportation problems normally associated with the generally poisonous monomeric ketenes.

Furthermore, the substituted trioxanes I are useful acetylating agents for alcohols, amines, acids, etc. For example, in the presence of acid catalysts, methanol was acetylated to methyl acetate by 2,4,6-tris-methylene-1,3,5-s-trioxane.

The following examples will serve to illustrate the preparation of various substituted trioxanes in accordance with the practice of this invention.

EXAMPLE 1

Chloroacetaldehyde trimer was prepared from monochloroacetaldehyde half hydrate following the procedure described by K. Natterer in Monatsh. Chem. 3, 442 (1882).

A mixture of chloroacetaldehyde trimer (25.9 g.; 0.11 mole), powdered sodium hydroxide (36.0 g.; 0.90 mole), 2,6-dimethyl-4-heptanol (200 ml.) and hydroquinone (about 0.1 g.) was heated to 175–200° C. for 3.5 hours (atm. pres.) and 7.0 g. of distillate collected in a receiver containing hydroquinone. Analysis of the reaction liquor indicated that 0.317 gm.-atom chloride ion (95.2% halogen cleavage) was present.

The distillate separated into two layers the lower, aqueous layer weighed 3.1 g. and the upper layer, 3.60 g. The upper layer was separated and dried over magnesium sulfate. A liquid product (1.73 g.; $n_D^{25}$ 1.4520) was removed from the 2,6-dimethyl-4-heptanol solvent under reduced pressure at 23° C./5.0 mm. Hg.

The following analytical data revealed that 2,4,6-tris-methylene-1,3,5-s-trioxane had been obtained.

*Analysis.*—Calcd. for $C_6H_6O_3$ (percent): C, 57.11; H, 4.80. Found (percent): C, 56.92; H, 4.70.

Mass spectroscopy revealed a molecular ion peak at m/e 126, further confirming that the ketene trimer had been obtained. The major fragment ion, m/e 42, corresponds to ketene monomer. Infrared analysis (6 cm., heated cell) revealed absorption peaks at $5.95\mu$, $6.30\mu$, $7.45\mu$, $7.70\mu$, $9.70\mu$ and $12.50\mu$.

Proton NMR analysis revealed a single line spectrum (equivalent protons): chemical shift (in $CDCl_3$), 3.8 p.p.m.; coupling constant, $J_{C13-H}$, 166Hz.

The 2,4,6-tris-methylene-1,3,5-s-trioxane was eluted under the following VPC conditions:

Instrument: Aerograph Gas Chromatograph (Model A–90–A)
Column: 6 ft. x ¼″ aluminum
Packing: 20% Igepal on Chromosorb W (80/1000 mesh)
Column temp.: 130° C.
Pressure: 20 p.s.i.g. He
Injection port temp.: 200° C.
Detector temp.: 230° C.
Retention time: 0.85 min.

EXAMPLE 2

To potassium hydroxide (44.9 g., 85% assay., 0.68 mole) heated at 190° in a 250 ml. flask was added chloroacetaldehyde trimer (0.05 mole; 11.78 g.) in portions during a 1.5 hour period. Volatiles were removed by passage of nitrogen and collected in a receiver cooled at −78° C. VPC analysis indicated the presence of a product eluting under the conditions described in Example 1, thereby confirming that 2,4,6-tris-methylene-1,3,5-s-trioxane had been obtained.

EXAMPLE 3

α-Chloro-i-butyraldehyde trimer was prepared by chlorination of i-butyraldehyde followed by treatment with sulfuric acid following the procedure described by C. L. Stevens and B. T. Gillis, J. Am. Chem. Soc. 79, 3448 (1957).

The amount of 63.9 g. (0.2 mole) of α-chloro-i-butyraldehyde trimer was added to a mixture of powdered sodium hydroxide (1.2 moles, 48 g.) in 2,6-dimethyl-4-heptanol and the mixture heated at 165–177° C. for 1.5 hours. Then the organic products were removed under reduced pressure at 165–177° C./20 mm. Upon cooling the distillate at −78° C., 5.4 g. of a white precipitate, M.P. 54–62° C., was obtained. Nuclear magnetic resonance indicated the absence of the characteristic acetal hydrogen at 4.6 p.p.m. Mass spectroscopy revealed a fragment at m/e 70, corresponding to dimethyl ketene, a decomposition product of the desired 2,4,6-tris-isopropylidine-s-trioxane.

EXAMPLE 4

The 2,4,6-tris-methylene-1,3,5-s-trioxane (0.025 ml.) obtained in Example 1 was mixed with 0.5 ml. of methanol and 0.01 ml. of formic acid. Infrared analysis revealed no bands at $5.95\mu$ and $7.70\mu$, indicating the absence of 2,4,6-tris-methylene-1,3,5-s-trioxane. Absorption peaks at $5.6\mu$ and $8.0\mu$ revealed the presence of methyl acetate. Proton NMR analysis, vapor phase chromatography and mass spectral analysis confirmed that methyl acetate had been obtained.

What is claimed is:

1. A substituted trioxane having the formula $$\begin{array}{c} O \\ R_2C=C \diagup \diagdown C=CR_2 \\ | \quad \quad | \\ O \quad \quad O \\ \diagdown C \diagup \\ \| \\ CR_2 \end{array}$$

wherein R is an independently selected hydrogen, halogen, or alkyl.

2. The substituted trioxane of claim 1 having the formula $$\begin{array}{c} O \\ R_2C=C \diagup \diagdown C=CR_2 \\ | \quad \quad | \\ O \quad \quad O \\ \diagdown C \diagup \\ \| \\ CR_2 \end{array}$$

wherein R is an independently selected hydrogen or lower alkyl.

3. The substituted trioxane of claim 2 having the name 2,4,6-tris-methylene-1,3,5-s-trioxane.

4. The substituted trioxane of claim 2 having the name 2,4,6-tris-isopropylidine-s-trioxane.

5. The substituted trioxane of claim 2 wherein R is independently lower alkyl.

6. The substituted trioxane of claim 2 wherein R is hydrogen.

References Cited

UNITED STATES PATENTS 3,274,162  9/1966  Bergman _____ 260—340X

FOREIGN PATENTS 339,882  12/30  Great Britain.

NORMA S. MILESTONE, Primary Examiner

U.S. Cl. X.R.

260—340, 585.5